United States Patent [19]

Hoekstra

[11] Patent Number: 4,805,877

[45] Date of Patent: Feb. 21, 1989

[54] TENDON STRESSING JACK AND METHOD

[76] Inventor: Charles Hoekstra, 4294 Hopkins Lake Dr., Duluth, Ga. 30136

[21] Appl. No.: 101,829

[22] Filed: Sep. 28, 1987

[51] Int. Cl.⁴ ............................................. E21B 19/00
[52] U.S. Cl. ..................................... 254/29 A; 29/452
[58] Field of Search ............. 254/29 A, 29 R; 29/452

[56] References Cited

U.S. PATENT DOCUMENTS

| 399,676 | 3/1889 | Leuner . | |
|---|---|---|---|
| 1,708,333 | 4/1929 | Smith . | |
| 1,987,815 | 1/1935 | Bartol | 265/2 |
| 2,668,444 | 2/1954 | Berman | 73/88 |
| 3,045,480 | 7/1962 | Decker et al. | 73/144 |
| 3,902,698 | 9/1975 | Furrer et al. | 254/10.5 |
| 4,053,974 | 10/1977 | Howlett et al. | 29/452 |
| 4,192,215 | 3/1980 | Hymans | 254/29 A X |
| 4,345,740 | 8/1982 | Macchi | 254/29 A |
| 4,376,527 | 3/1983 | Ludvigson | 254/29 A |
| 4,405,114 | 9/1983 | Macchi | 254/29 A |

Primary Examiner—William L. Sikes
Assistant Examiner—Frank González
Attorney, Agent, or Firm—Thomas & Kennedy

[57] ABSTRACT

A tendon stressing jack has a gauge for measuring the length of tendon travel during a tendon stressing operation as a method of determining tendon stress.

9 Claims, 2 Drawing Sheets

U.S. Patent  Feb. 21, 1989  Sheet 1 of 2  4,805,877
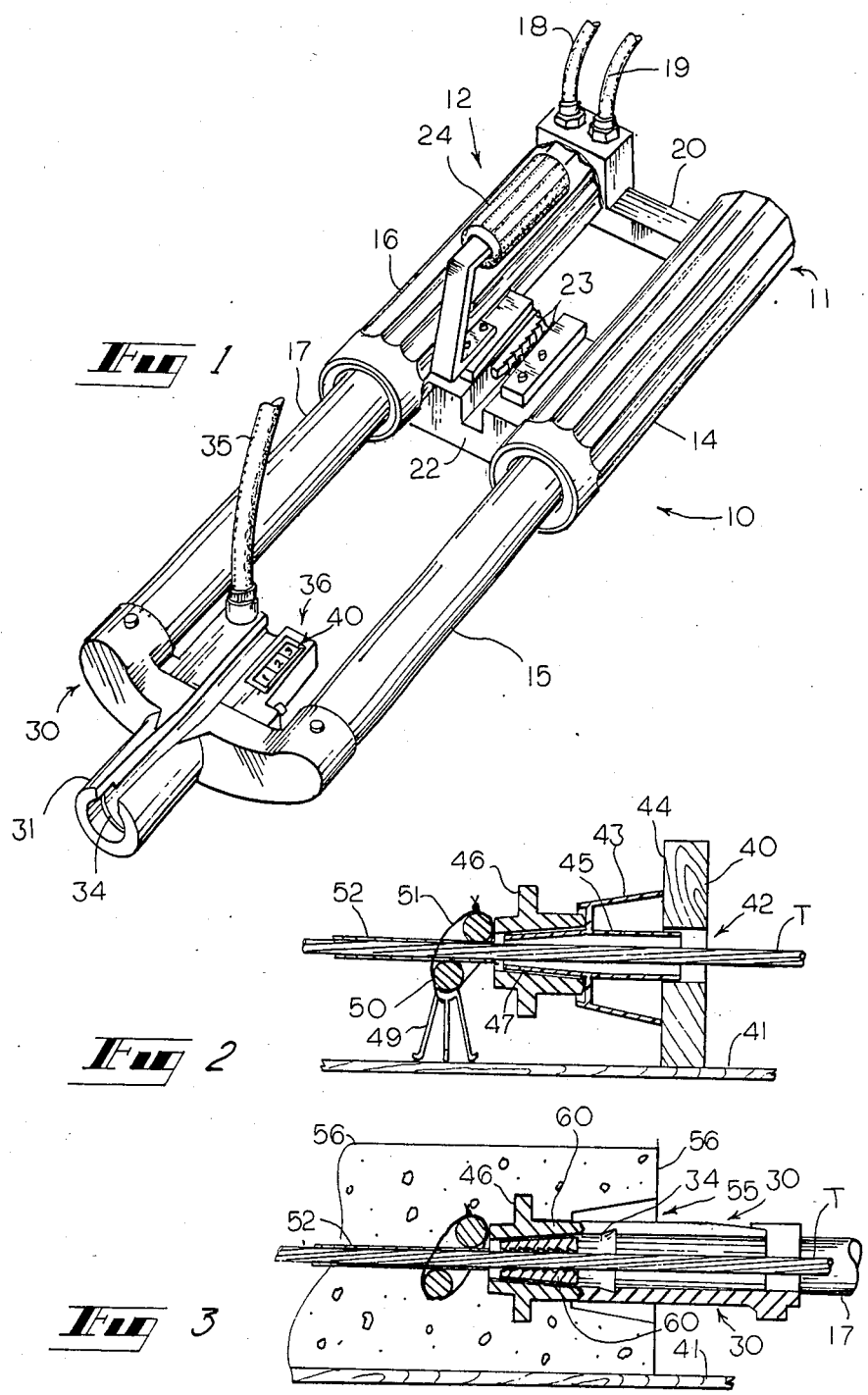

TENDON STRESSING JACK AND METHOD

TECHNICAL FIELD

This invention relates generally to jacks used in stressing tendons and to methods employed in stressing tendons.

BACKGROUND OF THE INVENTION

Concrete structures are commonly reinforced with embedded steel cables referred to as tendons. Their presence serves to enhance the load supporting capabilities of the structures and to limit sagging. This is done by forming the structures with embedding tubes through which the tendons loosely extend. Once the structure has been erected the tendon can be anchored to one end of the structure and the other end then elongated out of the opposite end and anchored while being stressed.

The magnitude of stress that should be imparted to a tendon can be calculated for structures of given sizes and designed load capacities. With this known a tendon stressing jack can be used to stress the tendon to the calculated degree of stress by reference to a jack hydraulic pressure gauge. In other words, by referencing the pressure exerted by the hydraulic jack one may theoretically determine the stress on the tendon as it is being stressed. Thus, once a proper reading is made the tendon is permanently anchored in that condition of stress.

It sometimes occurs that calculations of tendon stress derived from jack hydraulic pressure readings are erroneous. For example, sometimes the tube through which a tendon passes becomes breached thereby enabling concrete to enter and directly embed a portion of the tendon. In addition, tendons may become snagged from other causes. When this occurs jack operations fail to stress that portion of the tendon located beyond the embedment or snag which condition is not made apparent from hydraulic pressure gauge readings of the jack. Because of this tendons are often marked with paint to measure elongation as a safety crosscheck. This however is relatively crude and inaccurate since the markings tend to be applied differently by different workers and become blurred and faint from grease and handling.

Accordingly, it is seen that if a tendon stressing jack could be devised that could measure the stress being applied to a tendon during jack operations in an accurate, reliable and easy manner, a distinct advance in the art would be achieved. It is to the provision of such that the present invention is primarily directed.

SUMMARY OF THE INVENTION

In one form of the invention a tendon stressing jack comprises hydraulic cylinder means that includes a stationary component adapted to be positioned against a structure out of which a tendon extends and a movable component that bears tendon gripping means. The jack further comprises gauge means mounted to one of said hydraulic cylinder means components for measuring travel of a tendon in response to actuation of the hydraulic cylinder means for determining the magnitude of stress being applied to the tendon by the jack.

In another form of the invention a tendon stressing jack comprises a pair of hydraulic cylinders having a pair of cylinders mounted together in mutually spaced, side by side relation from which a pair of pistons extends. A nosepiece is mounted to the ends of the pistons located distally from the cylinders. The nosepiece has a guide channel through which a tendon may extend. Tendon gripping means are mounted between the cylinders in alignment with the guide channel. Gauge means are mounted to the nosepiece for measuring and displaying the displacement of a tendon as it is pulled through the guide channel by operation of the hydraulic cylinders.

In still another form of the invention a method of stressing a tendon that extends through a structure to be reinforced comprises the steps of attaching a portion of the tendon that extends out of the structure to a jack. The jack is operated so as to cause it to extend the tendon further out of the structure while gauging the length of the tendon pulled out of the structure. The tendon is anchored in its stressed condition when the gauged length substantially matches that which represents a desired magnitude of tendon stress.

BRIEF DESCRIPTION OF THE DRAWING

FIG. 1 is a perspective view of a tendon stressing jack that embodies principles of the invention in a preferred form.

FIG. 2 is a cross-sectional view of tendon anchoring means set preparatory to the formation of a concrete structure with a reinforcing tendon.

FIG. 3 is another cross-sectional view similar to that of FIG. 2 after a concrete structure has been formed about the anchoring means.

DETAILED DESCRIPTION

Figure 4:
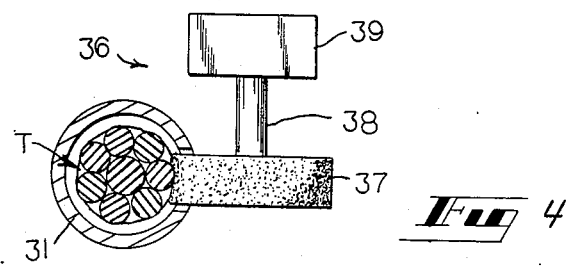
FIG. 4 is a side elevational view of a gauge component of the jack shown in FIG. 1.

With reference next to FIG. 1, there is shown a tendon stressing jack 10 which has two hydraulic cylinders 11 and 12 mounted in mutually spaced, side-by-side relation. The hydraulic cylinder 11 has a cylinder 14 from which a piston 15 extends. Similarly, the hydraulic cylinder 12 has a cylinder 16 from which a piston 17 extends parallel with the piston 15. The two hydraulic cylinders are operated from an unshown hydraulic power system that is coupled with the jack via hydraulic lines 18 and 19 that extend to the back or base of cylinder 16 and also to the back or base of cylinder 14 through a channel 20. The forward ends of the two cylinders 14 and 16 are mounted together with an open channel member 22 to which a pair of tendon grippers 23 are mounted. A handle 24 is also mounted to the channel member.

A nosepiece or head 30 is mounted to the ends of the pistons 15 and 17 located distally from their respective cylinders. The nosepiece has a tubular guide channel 31 which is located coaxially with the pair of grippers 23 and which is adapted to receive a multi-filament, hardened steel tendon T that is normally quite rigid. The head has a seating attachment 34 slidably mounted thereto for the seating of a set of tendon grippers 60 within a tendon anchor 46. The seating attachment is also powered by the unshown hydraulic power system to which it is connected by a hydraulic line 35. The head or nosepiece 30 also has a gauge mounted adjacent the guide channel 31 for gauging the travel of a tendon through the guide channel.

With reference also to FIG. 4, the gauge 36 is seen to have a friction wheel 37 that extends into the guide channel 31 and into rolling, frictional engagement with the tendon T. The wheel 37 is coupled via a rotatable shaft 38 to a counter 39 that counts wheel revolutions and fractions thereof as the wheel 37 rotates when driven by a tendon T pulled through the guide channel by the jack 10. The counter has a multi-digit display 40 which is seen in FIG. 1 to have three counter wheels that bear single digits. As the last digit denotes tenths of inches, 12.3 inches is shown displayed in FIG. 1. Numerous commercially available counters may be employed such as a Vitaroot digital counter or Durant Model X, Model YE or Model H counter. In FIG. 1 the gauge is mounted to the nosepiece which remains stationary during a stressing operation. However, if desired it could be mounted to the movable portion of the jack as to one of the cylinders with its wheel in rolling contact with a piston.

With reference next to FIGS. 2 and 3 the procedure typically initiated in reinforcing a concrete body with a tendon may be understood. In FIG. 2 an edge form 40 is shown positioned uprightly through an opening 41. A multi-stranded tendon T extends through an opening 42 in the form 40 after exiting a tube 52 through which it loosely extends. A plastic forming grommet 43 is mounted upon an inner face 44 of the form 40 with a tubular inner portion 45 seated within the opening 42. A cast metal tendon anchor 46 is positioned about a conical portion 47 of the anchor. A pair of reinforcement bars 50, tied together by a wire 51, are supported by a support bar chair 49 adjacent the anchor 46.

In FIG. 3 a concrete slab-like structure 56, which, for example, may be used as a beam, is seen to have been formed about the elements illustrated in FIG. 2 with the support bar chair having been removed from beneath the pair of reinforcement bars 50. Here the edge form 40 has also been removed as has the plastic forming grommet 43 to leave a stressing pocket 55 formed in the end of the concrete structure 56. The set of anchor grippers or wedges 60 are shown to have been urged by the seating attachment 34 well into the conical bore of the anchor 46 thereby permanently holding the tendon T in place after it has been stressed by the jack 10. Thus, the FIG. 3 view shows the jack, tendon and anchoring structures just prior to removal of the jack from the tendon and concrete structure by release of the jack grippers 23 from the tendon.

In operation the tendon T is positioned as shown in FIG. 2 passing through the reinforcement bars 50, the anchor 43, the forming grommet 43 and the form 40. The concrete slab 56 is then formed with the tendon remaining in place but with the support bar chair 49 removed. After the concrete sets the grommet 43 and form 40 are removed. For stressing, the tendon stressing jack 10 is mounted against the concrete slab side by butting the end of its nosepiece channel 31 up against an annular portion of anchor 46 located in the end of the stressing pocket 34, as shown in FIG. 3. The tendon T is then secured to the jack grippers 33. As the tendon is typically made of hard steel and is quite rigid, there ordinarily is no slack in the tendon as it extends through the tube 52 embedded within the concrete slab.

With the counter 40 zeroed the hydraulic cylinders are actuated causing them to move away from the nosepiece 30 as the pistons 15 are extended and in doing so to pull more of the tendon out of the end of the concrete slab. As this is done the tendon drives the metering wheel 37 of the gauge 36 as it travels through the nosepiece guide channel 31. This causes the linear travel of the tendon through the channel to be displayed as inches and fractions of inches on the gauge display 40. When a desired displacement or linear travel is shown on the counter display, which corresponds to a desired amount of tendon stress, the hydraulic cylinders are stopped. The seating attachment within the nosepiece is then actuated which causes the grippers 60 to be urged into the conical bore of the anchor 46 and into firm, permanent, gripping engagement with the tendon. The tendon is now permanently secured to the structure with the desired degree of stress. The tendon is then manually released from the grippers 23 and the jack removed.

Figure 5:
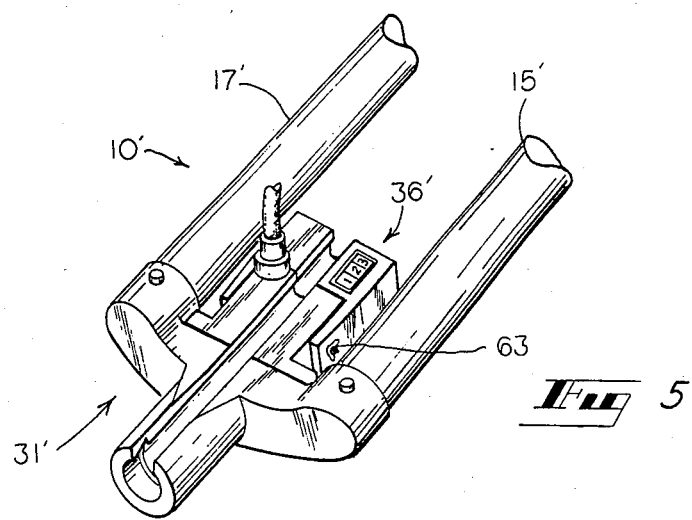
FIG. 5 is a fragmentary view of a tendon stressing jack to which a gauge has been removably secured for use in accordance with principles of the invention in another form.

In the FIG. 1-4 embodiment the gauge 36 is formed as an integral portion of the nosepiece or head 30. Alternatively, the gauge may be mounted to an existing head of conventional construction, as shown in FIG. 5. The gauge 36' here is simply attached by wing nuts 63 to the end of the nosepiece channel with the friction wheel positioned to engage a tendon extending through the channel.

The mathematical conversion of angular displacement of the metering wheel 37 to represent linear travel or displacement of the tendon T for display is conventionally exercised by the counter itself. The calculation of linear displacement as an indication of tendon stress is well known in the industry. Calculations of such may be readily had, for example, by reference to pages 352 and 353 of Post-Tensioning Manual, 4th edition, published by the Post-Tensioning Institute of Phoenix, Ariz.

It thus is seen that a tendon stressing jack and jack accessory, as well as a stressing method, are now provided by which the magnitude of stress imparted to a tendon can be observed during stressing operations in a very accurate and easy manner. It should be understood however that the just described embodiments merely illustrate principles of the invention in preferred forms. Many modifications, additions and deletions may, therefore, be made thereto without departure from the spirit and scope of the invention as set forth in the following claims.

I claim:

1. In a tendon stressing jack of the type having hydraulic cylinder means that includes a stationary component adapted to be positioned against a structure out of which a tendon extends and a movable component that bears tendon gripping means, the improvement comprising gauge means mounted to one of said components of said hydraulic cylinder means for measuring the linear travel of the tendon out of the structure in response to actuation of said hydraulic cylinder means for use in determining the magnitude of stress being applied to the tendon.

2. The tendon stressing jack of claim 1 wherein said gauge means comprises a friction wheel rotatably coupled with wheel revolution counter means.

3. The tendon stressing jack of claim 2 wherein said gauge means comprises a set of digit bearing wheels for displaying linear dimensions.

4. The tendon stressing jack of claim 2 wherein said gauge means is mounted to said stationary component with said friction wheel positioned for direct rolling contact with a tendon.

5. A tendon stressing jack comprising a pair of hydraulic cylinders having a pair of cylinders mounted together in mutually spaced side by side relation from which a pair of pistons extends, a nosepiece mounted to the ends of said pair of pistons located distally from said pair of cylinders and having a guide channel through which a tendon may extend, cable gripping means mounted between said pair of cylinders in alignment with said guide channel, and gauge means mounted to said nosepiece for measuring and displaying the linear displacement of the tendon as it is pulled through said guide channel.

6. The tendon stressing jack of claim 5 wherein said gauge means is removably mounted to said nosepiece.

7. The tendon stressing jack of claim 5 wherein said gauge means comprises a friction wheel coupled with wheel revolution counter means.

8. The method of stressing a tendon that extends through a structure to be reinforced comprising the steps of:
   (a) attaching a portion of the tendon that extends out of the structure to a jack,
   (b) operating the jack so as to cause it to pull a portion of the tendon out of the structure,
   (c) contemporaneously with step (b) gauging the length of tendon pulled out of the structure by the jack and
   (d) terminating jack operation and anchoring the tendon when the gauged length substantially matches that length which represents a desired magnitude of tendon stress.

9. The tendon stressed method claim 8 wherein the length of tendon pulled out of the structure is gauged with a gauge having a friction wheel mounted in rolling contact with the tendon.

* * * * *